Dec. 20, 1966     J. H. MARTIN     3,293,501
CERAMIC WITH METAL FILM VIA BINDER
OF COPPER OXIDE CONTAINING GLASS
Filed Nov. 24, 1964

SECTION A-A

*INVENTOR.*
JACOB H. MARTIN
BY
*Connolly and Hutz*
HIS ATTORNEYS

3,293,501
CERAMIC WITH METAL FILM VIA BINDER OF COPPER OXIDE CONTAINING GLASS

Jacob H. Martin, Williamstown, Mass., assignor to Sprague Electric Company, North Adams, Mass., a corporation of Massachusetts
Filed Nov. 24, 1964, Ser. No. 413,477
2 Claims. (Cl. 317—101)

This invention is concerned with an improved metal to ceramic bond.

Noble metal paint applied to a ceramic surface and fired to effect adhesion thereto, tends to delaminate when stored above 150° C. This condition is aggravated when solder and solder flux is applied to the metallized ceramic.

The principal object of the present invention is to overcome or at least greatly minimize the foregoing problem.

This and other objects and advantages of the present invention will be made obvious to those skilled in the art by the following description when considered in relation to the accompanying drawing of which:

Figure 1:
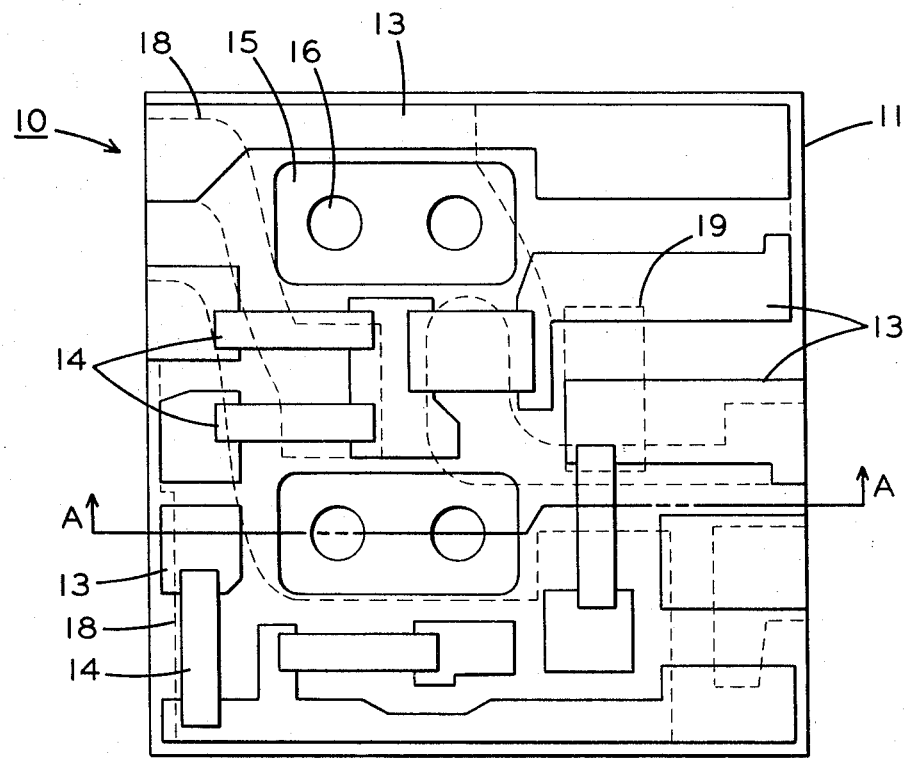
FIGURE 1 is a plan view of a ceramic based microcircuit of the present invention.
Figure 2:
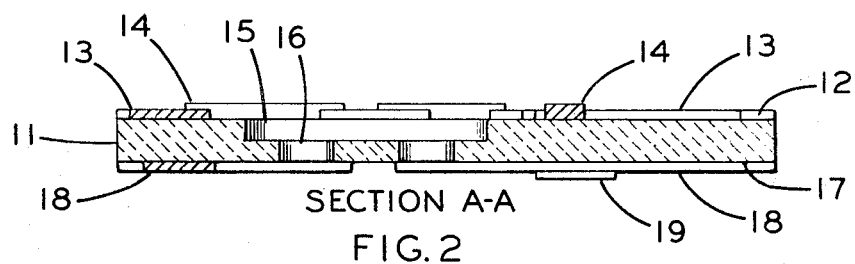
FIGURE 2 is a cross section taken along line A—A of FIGURE 1 in the direction of the arrows.

The present invention is based upon the discovery that noble metal films can be more firmly bonded to a ceramic substrate if the glass frit employed in the noble metal paint contains copper oxide.

The following examples illustrate the efficacy of copper oxide in enhancing the metal film adhesion to a ceramic surface.

|  | Example 1, gms. | Example 2, gms. |
| --- | --- | --- |
| $B_2O_3$ | 4 | 4 |
| $SiO_2$ | 4 | 4 |
| CdO | 8 | 8 |
| PbO | 8 | 8 |
| $Al_2O_3$ | 1 | 1 |
| $Bi_2O_3$ | 75 | 75 |
| CuO | 0 | 10 |

These mixes were melted in separate alumina crucibles, fritted, milled, and screened through a 400 mesh stainless steel screen. The two metal paints were formulated of the following constituents.

| | Gms. |
| --- | --- |
| Silver (750 mesh) | 54 |
| 12% ethyl cellulose in β-terpineol | 40 |
| Frit of Example 1 | 6 |

| | Gms. |
| --- | --- |
| Silver (750 mesh) | 54 |
| 12% ethyl cellulose in β-terpineol | 40 |
| Frit of Example 2 | 6 |

Layers, approximately 1 mil thick, of each paint were screened onto ceramic ($BaTiO_3$) pieces and fired at a temperature of about 1575° F. Tinned copper lead wires were soldered to each silver layer. The wire gage, amount of solder and position of the lead wire was the same in each case. A ninety degree pulling force was applied to each lead wire until the bond between the silver layer and the ceramic surface was overcome. Average bonds via the frit of Example 1 broke at 27.7 oz. whereas average bonds via the frit of Example 2 broke at 71 oz.

The following examples illustrate the use of copper oxide via an organo-copper compound in enhancing the adhesion of another metal film to a ceramic surface. Both examples were carried out under identical conditions, the only difference being the use of copper naphthenate instead of ethyl cellulose as the organic binder. The glass frit in each case was composed of 60% bismuth trioxide, 25% lead oxide, 10% silicon dioxide, 2% cadmium oxide, 1% boron oxide and 2% potassium oxide of 325 mesh. The metal employed was a 24 to 76% mixture of about 1 micron size platinum and 325 mesh gold.

*Example 3*

| | Gms. |
| --- | --- |
| Platinum-gold | 70 |
| Frit | 12 |
| 12% ethyl cellulose in β-terpineol | 18 |

*Example 4*

| | Gms. |
| --- | --- |
| Platinum-gold | 70 |
| Frit | 12 |
| 12% ethyl cellulose in β-terpineol | 9 |
| Copper naphthenate | 9 |

A 1 mil layer of each paint was screened onto two $BaTiO_3$ pieces and fired at a temperature of about 1500° F. Lead wires were attached and the comparative strength of the metal film-ceramic bonds tested as in Examples 1 and 2. The bond via the composition of Example 3 broke at 13 oz., whereas the bond via the frit of Example 4 broke at 40 oz.

During firing of the ceramic piece having the layer of paint from Example 4, the copper naphthenate decomposes to copper oxide. The copper oxide consists mainly of cupric oxide with a minor amount of cuprous oxide. Copper oxide added in this manner is as effective as that of Example 2.

Instead of adding cupric oxide or an organocopper compound to the metal paint formulations, cuprous oxide can be employed in the same manner with comparable effectiveness.

Referring to the drawing, a ceramic based microcircuit 10 comprises a ceramic substrate 11 having an upper surface 12 with fired-on metal electrodes 13. Resistors 14 are positioned between various electrodes. Transistor recess areas 15 and transistor lead holes 16 are adapted to accommodate two transistors. The lower surface 17 of the substrate has fired-on electrodes 18 and a resistor 19. The electrodes are formed from a metal paint of the present invention, e.g. that of Example 2.

The present invention contemplates the improvement of the bond between a ceramic and any of the metals usually employed in association with a ceramic. The metals of main interest are the noble metals, i.e. silver, gold, the platinum group metals and mixtures thereof.

The glass frit can be any frit generally employed as a binder system for metals applied as a metal paint.

By ceramic material is meant metal oxides and mixed oxides e.g. those typified by barium titanate, alumina, glass, zirconia, steatite and the like. The ceramic may be classified either semiconducting or electrically insulating depending upon its end use.

While copper naphthenate has been employed as the copper oxide precursor in Example 4, it is to be understood that any organocopper compound which can be decomposed to copper oxide during firing can be employed. The manner of oxide addition is not critical.

As used herein, the term copper oxide is intended to include a member of the group consisting of cupric oxide, cuprous oxide and mixtures thereof.

Depending upon the composition of the metal paint, the firing temperature and the method of adding the copper oxide, the most useful range of copper oxide addition is from about 0.1% to about 30% of the solids content of the paint.

The amount of glass frit present in relation to the metal will depend upon the end use of the metal-glass frit film. For electrical purposes, there must not be so much glass as to disrupt electrical continuity; however, there must be enough to effect, in conjunction with the copper oxide, a sensible bond between the metal film and the ceramic surface.

The metal paints described herein can be employed wherever prior art compositions of the same general type have been used. Examples of such use are: as the electrode material in ceramic capacitors and in ceramic based microcircuits; as the decorative metal in any field requiring the same. The paints can be used in forming interconnecting conducting paths for some or all elements of a circuit as well as for the plates of a capacitor.

As is evident from the foregoing, the invention is not to be limited to formation of the rather specific illustrative metallized ceramic. Modifications and variations as well as the substitution of equivalents may be made without departing from the spirit of the invention as defined in the appended claims.

What is claimed is:

1. In a ceramic capacitor, a ceramic based microcircuit or the like, structure including a ceramic substrate having at least one conductive film bonded thereto: the improvement wherein said conductive film is derived from an intimate mixture of a noble metal, a glass composition and an organocopper compound, said organocopper compound being decomposable to an adhesion-enhancing proportion of copper oxide equivalent to from 0.1 to 30% by weight of said glass composition and said noble metal; said film having been fired to a temperature sufficient to decompose said organocopper compound to copper oxide and effectively bond said conductive film to said substrate via said copper oxide and said glass composition.

2. In a ceramic capacitor, a ceramic based microcircuit or the like, structure including a ceramic substrate having at least one conductive film bonded thereto; the improvement wherein said conductive film consists essentially of an intimate mixture of a noble metal and a glass composition, said glass composition containing an adhesion-enhancing proportion of copper oxide of from 0.1–30% by weight of said glass composition and said noble metal, said film having having been fired to a temperature sufficient to effectively bond said conductive film to said substrate via said copper oxide and said glass composition.

References Cited by the Examiner

UNITED STATES PATENTS

| | | | |
|---|---|---|---|
| 3,042,721 | 7/1962 | Cumpston | 174—68.5 |
| 3,075,860 | 1/1963 | Veres | 117—227 X |
| 3,124,478 | 3/1964 | Cirkler et al. | 117—227 X |
| 3,154,503 | 10/1964 | Janakirama-Rao et al. | 252—514 |

ROBERT K. SCHAEFFER, *Primary Examiner.*

KATHLEEN H. CLAFFY, ROBERT S. MACON, *Examiners.*

J. J. BOSCO, *Assistant Examiner.*